July 10, 1951     A. B. DODGE     2,560,420
LAMINAR PRODUCT OF POLYMERIZED VINYL CHLORIDE RESIN AND
COMMINUTED CORK AND PROCESS OF MANUFACTURING THE SAME
Filed Sept. 20, 1948
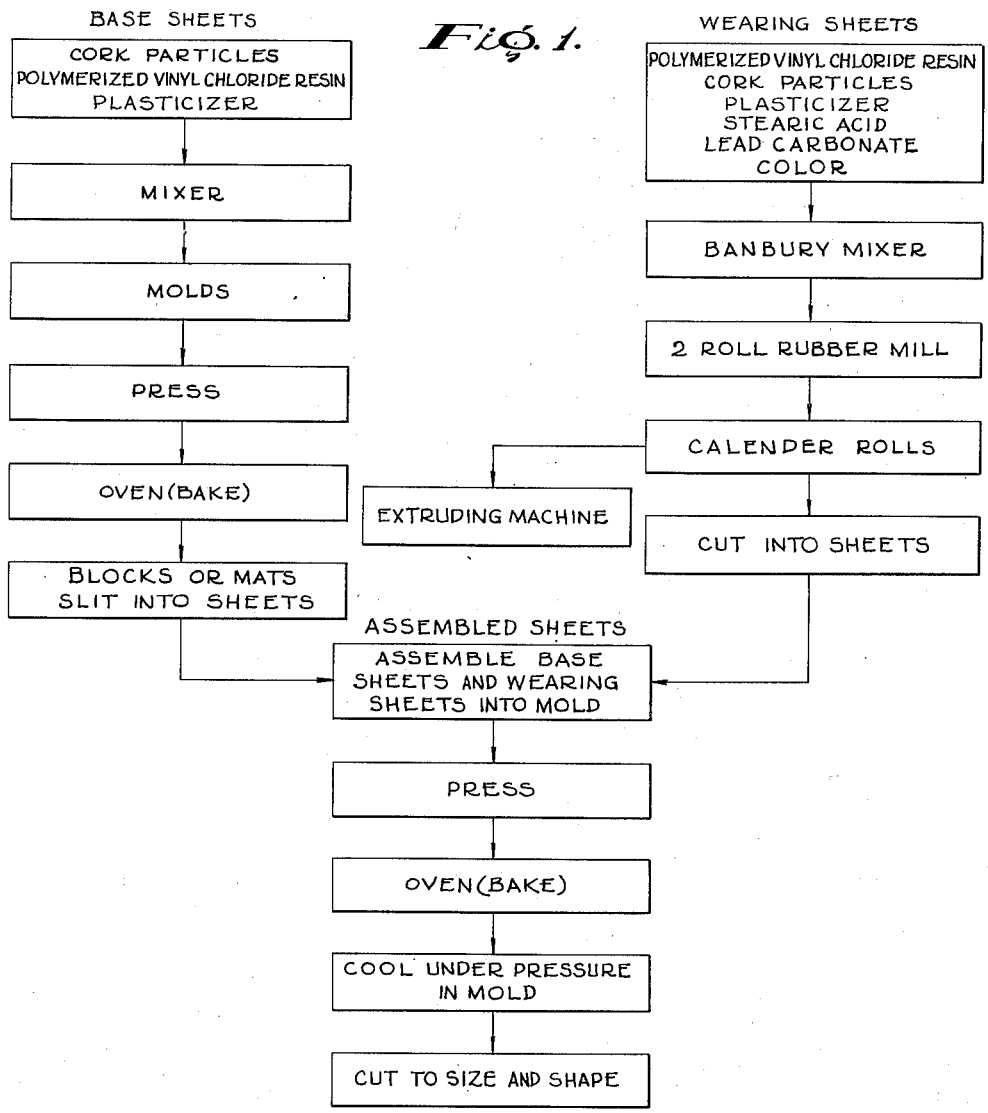
INVENTOR
Arthur B. Dodge
BY
Cameron, Kerkam & Sutton
ATTORNEYS Patented July 10, 1951

2,560,420

UNITED STATES PATENT OFFICE 2,560,420

LAMINAR PRODUCT OF POLYMERIZED VINYL CHLORIDE RESIN AND COMMINUTED CORK AND PROCESS OF MANUFACTURING THE SAME

Arthur B. Dodge, Lancaster, Pa., assignor to The Dodge Cork Company, Incorporated, Lancaster, Pa., a corporation of Pennsylvania Application September 20, 1948, Serial No. 50,196

7 Claims. (Cl. 154—102)

This invention relates to compositions of matter and processes for obtaining the same and more particularly to compositions of matter in which a polymerized vinyl chloride resin and comminuted cord are the principal ingredients.

The polymerized vinyl chloride resins have been widely used for many purposes where shrinkage and expansion are not critical. These resins however may expand or shrink from 6 to 9% and their desirable properties were not utilized prior to my present invention where such shrinking or expansion is critical. I have found that I can control this shrinking or expansion by mixing ground cork or cork flour with the resin whereby I insulate the resin and thus practically eliminate shrinkage and expansion. The compositions of matter which I have obtained are stable both to heat and cold with negligible expansion and contraction between 0 and 150° F.

It is accordingly an object of the present invention to provide novel compositions of matter suitable for many uses such as cap linings, gaskets, floor coverings, shoe soles, wall coverings, printing press blankets, artificial leather, typewriter rolls, deck covering for boats, spinning cots, and many other uses in which a polymerized vinyl chloride resin and comminuted cork are the principal ingredients.

Another object of the present invention is to produce new compositions of matter which are tough and resilient and which will withstand the action of oil, acids, alkalies, alcohols and many other solvents.

Another object of the present invention is to provide new compositions of matter which may be given highly polished surfaces when desired or which may be provided with roughened non-skid surfaces when desirable.

Another object of the present invention is to provide new compositions of matter which are especially adapted for use as floor or wall coverings.

Another object of the present invention is to provide new compositions of matter, particularly adapted for floor coverings which lie flat and do not shrink or expand; which are resilient; which can be made skid-proof; which are fire retardant; and which are provided with wearing surfaces which are particularly resistant to wear.

Another object of the present invention is to provide new compositions of matter which are particularly useful as floor coverings in which a base sheet is provided in which comminuted cork and polymerized vinyl chloride resin are the principal ingredients, the cork being present in greater quantity than the resin and to which a wear resistant surface is adhered to said base sheet by heat and pressure, the wear resistant surface comprising comminuted cork and polymerized vinyl chloride resin, the resin being present in greater quantity than the comminuted cork.

Another object of the present invention is to provide new compositions of matter which may be provided with any desired color or colors and which may be fabricated to resemble tile.

Other and further objects of the present invention will appear from the following description of my invention in which specific processes and mixtures are described to illustrate the same. These illustrations are not to be construed as defining or limiting my invention and reference should be had to the appended claims for this purpose.

My invention may be embodied in a sheet designed primarily as a wearing surface; or in a sheet designed primarily for resiliency as a base sheet; or in a joined wearing surface and base sheet.

The composition of the wearing surface may be varied to meet known conditions of use and is made of a polymerized vinyl chloride resin, to which is added a smaller quantity by weight of ground cork and a plasticizer, preferably di-2-ethylhexyl phthalate, dioctyl phthalate, to facilitate the even distribution of the resin and cork particles and plasticize the resin. I also preferably incorporate stearic acid as a lubricant, lead carbonate to minimize chemical deterioration, and suitabel coloring material. If a particularly dense wearing surface is desired diatomaceous earth, whiting or similar materials may be added. These components are mixed in a steam jacketed mixer, such as a Banbury mixer, until the mass becomes plastic. The heated and plastic mass is then thoroughly homogenized by additional mixing as on a two-roll rubber mill after which it is calendered to desired width and thickness and cut into sheets. This material may also be extruded into tubes or other dimensional shapes for various uses and purposes.

As noted above, the amounts of the various ingredients of the wearing surface can be varied to meet requirements of use. As an example of this new composition the following ingredients in the amounts indicated have been mixed and calendered to give compositions of matter having the desired properties described above:

| Ingredients: | Parts by weight |
|---|---|
| Polymerized vinyl chloride resin | 218 |
| Cork | 100 |
| Plasticizer | 111 |
| Stearic acid | 5 |
| Lead carbonate | 10 |
| Color | 50 |

As noted above, diatomaceous earth, whiting and similar materials may be added when a particularly dense wearing surface is desired. It is also to be noted that the degree of comminution of the cork determines the smoothness of the surface of the material and when a non-skid surface is desired the size of the cork particles is larger than when a polished and smooth surface is desired.

The cork in the base sheet is in larger quantity by weight and preferably of larger particle size than in the wearing surface to provide the desired resiliency or yield; and the size of the particles of cork in the base sheet may be varied as desired for this purpose.

The ground cork for the base sheet is thoroughly mixed with polymerized vinyl chloride resin and plasticizer and the resulting mixture is placed in a mold where it is placed under a pressure of about 115 pounds per square inch to obtain proper adherence between the particles of cork and polymerized vinyl chloride resin and to give the desired density and thickness. During compression the mixture is baked for a period of from 6 to 8 hours at a temperature of approximately 260° F. The resulting block or mat is then withdrawn from the mold and is cut or split into sheets of desired thickness.

As an example of the ingredients and the amounts thereof employed in the base sheet I have found that a satisfactory composition may be obtained from the following:

| Ingredients: | Parts by weight |
| --- | --- |
| Cork | 32 |
| Polymerized vinyl chloride resin | 6 |
| Plasticizer | 2 |

In addition four parts of water or two parts of water and one part of glycerin may be added to this mixture to prevent excessive drying of the cork during baking and to facilitate the splitting or cutting of the block into sheets.

When the so-called wearing and base sheets are to be used for flooring and deck coverings and the like the wearing surface and base sheet made as above described are joined by the use of heat and pressure. I have found it to be advantageous and economical to adhere the sheets by assembling them in a mold, one upon the other. A heavy steel plate (for example ¼" thick) is first placed in the mold and a base sheet is placed thereon and a wearing surface sheet placed on top of the base sheet. A polished steel plate (for example ⅛" thick) is placed on top of the wearing surface sheet and a second base sheet is placed on the top of the steel plate. A second wearing surface is placed upon the second base sheet and a second polished steel plate is placed on the top of the second wearing surface sheet and so on until the mold is filled. A heavy steel plate (for example ¼" thick) is then placed on top of the pile and pressure is applied so that the entire contents of the mold are placed under a pressure of about 125 pounds per square inch. The top heavy steel plate secures even distribution of pressure.

The top plate is then locked in position and the mold and contents are heated in an oven for a period of from four to six hours at approximately 260° F. Thereafter the mold is removed from the oven and the contents cooled for about six hours under pressure in the mold to maintain the bond, after which the pieces are removed from the mold and it is found that the wearing surface sheets are uniformly and permanently secured to the base sheets and that there is a definite bonding between the resin of one sheet and the resin of the other. Thereafter the unitary base sheet and wearing surface sheet may be cut to desired sizes and shapes to resemble tile, parquetry and the like.

It is a matter of practical importance that after the polymerized vinyl chloride resin, comminuted cork and other components have been mixed and blended as described they need not be calendered or extruded immediately but may be stored until their ultimate use is determined. This is a great advantage because requirements as to thickness and shape vary. Furthermore all scrap material accumulated can be reworked or used merely by reheating on a rubber mill and then calendered or extruded the same as the virgin compound. This is due to the fact that the original compound from which the scrap is produced does not have to be cured, vulcanized or oxidized as do practically all other compounds such as linoleum, rubber and the like.

The accompanying drawing shows in Fig. 1 a flow sheet illustrating a procedure for producing the new compositions of matter and in Fig. 2 the two layers of the invention with a briefing of the composition of each layer.

It is noted that for certain uses such as shoe soles, gaskets, cap linings, artificial leather and the like the wearing surface sheet may be used without the base sheet; and the material of the wearing surface may be extruded in shapes other than sheets as for example tubes for typewriter rolls, spinning cots, cove base for flooring and the like.

The base sheet may be employed without the wearing surface where more resiliency is desired and hard surface wear is not present as in printers blankets, gaskets, fishing rod handles, and the like.

The unitary base sheet and wearing surface sheet may be used for various purposes such as floor, deck and wall coverings, beach shoes, sandals, and the like.

By the present invention I have provided new compositions of matter and processes for making them of which polymerized vinyl chloride resin and comminuted cork are the principal ingredients; which are resistant to the action of oils, acids, alkalies, alcohols and other solvents; which may have polished or non-skid surfaces as desired; which are of particular use as floor and wall coverings; which have negligible expansion and contraction in normal temperature ranges; which are fire retardant; and particularly which may be advantageously made in two adherent plies one having more resilience than the other because of the excess of cork and the other having more wear resistance than the other because of the excess of the resin.

I conclude from study and observation that the extraordinary result of counteracting substantially all shrinking and expanding effects of the polymerized vinyl chloride resin so that the sheets lie flat, whether considered separately or joined as wear surface and base, is caused by the insulating effect of the cork particles surrounded by the polymerized vinyl chloride resin particles. Cork has millions of tiny air-filled cells and will not bulge at the sides when tightly compressed, the air within the cells being compressed. This cellular construction also accounts for the high insulating quality of cork and for its resilience.

The cork in addition to this functional insulating effect of counteracting shrinking and expanding makes the new composition much lighter in weight as compared with usual vinyl compounds.

Changes to or modifications of the above described illustrative examples and processes of my invention may now be suggested to those skilled in the art without departing from my inventive concept. Any of the several vinyl resins may be used depending on the characteristics desired; the cork may be ground to various degrees of fineness; and any suitable plasticizers and colors may be employed as will be readily apparent to those skilled in the art. Reference should therefore be had to the appended claims to determine the scope of this invention.

What is claimed is:

1. A new article of manufacture comprising a base sheet of cork particles adhered to a polymerized vinyl chloride resin, and a wear resistant surface sheet comprising a polymerized vinyl chloride resin the particles of which are insulated by comminuted cork and which surface sheet is adhered to said base sheet by the bonding of the polymerized vinyl chloride resins in the base and wear sheets under heat and pressure.

2. A new article of manufacture comprising a wear resistant surface of polymerized vinyl chloride resin and comminuted cork the resin being in excess of the cork by weight, and a base sheet of cork and polymerized vinyl chloride resin the cork being in excess of the resin by weight and said base sheet being permanently adhered to the wear surface by the mutual bonding of said resins under heat and pressure, the cork in the sheets being surrounded by the resin to produce a flat unitary piece and prevent contraction or expansion.

3. A new article of manufacture comprising a wear resistant surface of polymerized vinyl chloride resin filled with smaller amount of comminuted cork and containing a plasticizer, and a resilient base sheet of a larger amount of comminuted cork and polymerized vinyl chloride resin the resin in which is interlocked with the resin in said wear resistant surface under heat and pressure.

4. A two-ply sheet having a wear resistant surface including 218 parts by weight of polymerized vinyl chloride resin, 100 parts by weight of comminuted cork, 111 parts by weight of plasticizer, 5 parts by weight of stearic acid, 10 parts by weight of lead carbonate, 50 parts by weight of coloring matter, and permanently adhered by heat and pressure to a resilient base sheet including 32 parts by weight of comminuted cork, 6 parts by weight of polymerized vinyl chloride resin and 2 parts by weight of plasticizer.

5. A process for making a two-ply sheet having a wear resistant surface and a resilient base including the steps of mixing and heating until plastic and homogeneous a polymerized vinyl chloride resin, a comminuted cork filler and a plasticizer, calendering the homogeneous and plastic mix to sheets of desired width and thickness, mixing comminuted cork and a polymerized vinyl chloride resin and molding this mixture under heat and pressure into a resilient block, separating said block into base sheets, and then adhering the wear resistant sheets to the base sheets by heat and pressure.

6. A process for making a two-ply sheet having a wear resistant surface and a resilient base including the steps of mixing and heating until plastic and homogeneous a polymerized vinyl chloride resin, a comminuted cork filler and a plasticizer, calendering the homogeneous and plastic mix to sheets of desired width and thickness, mixing comminuted cork and a polymerized vinyl chloride resin and molding this mixture under heat and pressure into a resilient block, separating said block into base sheets, then adhering the wear resistant sheets to the base sheets by heat and pressure, and cooling under pressure to maintain the bond between the sheets.

7. A process for making a two-ply sheet having a wear resistant surface and a resilient base including the steps of mixing and heating until plastic and homogeneous a polymerized vinyl chloride resin, a comminuted cork filler and a plasticizer, calendering the homogeneous and plastic mix to sheets of desired width and thickness, mixing comminuted cork and a polymerized vinyl chloride resin and molding this mixture under heat and pressure into a resilient block, separating said block into base sheets, then adhering the wear resistant sheets to the base sheets by heat and pressure, cooling under pressure to maintain the bond between the sheets, and then cutting said sheets to size and shape.

ARTHUR B. DODGE.

REFERENCES CITED

The following references are of record in the file of this patent:

UNITED STATES PATENTS

| Number | Name | Date |
| --- | --- | --- |
| 1,891,723 | Novak | Dec. 20, 1932 |
| 1,966,856 | Groff | July 17, 1934 |
| 1,979,988 | Munroe | Nov. 6, 1934 |
| 2,026,594 | Richter | Jan. 7, 1936 |
| 2,428,282 | Kemmler | Sept. 30, 1947 |
| 2,455,198 | Vaala | Nov. 30, 1948 |
| 2,463,952 | Cooke | Mar. 8, 1949 |
| 2,498,653 | Daly | Feb. 28, 1950 |

FOREIGN PATENTS

| Number | Country | Date |
| --- | --- | --- |
| 575,393 | Great Britain | Feb. 15, 1946 |